United States Patent [19]

Chambley

[11] 4,035,533
[45] July 12, 1977

[54] TUFTED CARPET WITH MELTABLE-FILM PRIMARY-BACKING COMPONENT

[75] Inventor: Philip Wayne Chambley, Rome, Ga.

[73] Assignee: Champion International Corporation, Stamford, Conn.

[21] Appl. No.: 691,371

[22] Filed: June 1, 1976

[51] Int. Cl.² .................................. B32B 33/00
[52] U.S. Cl. .............................. 428/95; 156/72; 428/913
[58] Field of Search ............... 428/95, 96, 913; 156/72

[56] References Cited

U.S. PATENT DOCUMENTS

| | | | |
|---|---|---|---|
| 2,866,206 | 12/1958 | Gebert | 428/95 |
| 2,913,803 | 11/1959 | Dodds | 428/95 |
| 3,075,865 | 1/1963 | Cochran | 428/95 |
| 3,661,691 | 5/1972 | Slosberg | 428/95 |
| 3,779,799 | 12/1973 | Kennedy | 428/95 |

Primary Examiner—Marion E. McCamish
Attorney, Agent, or Firm—Evelyn M. Sommer

[57] ABSTRACT

A low-melting point layer of thermoplastic synthetic film is superimposed upon the rear side of a primary backing layer. Pile-forming yarns are then tufted from this rear side through both of these layers to form at the front side of the primary backing layer a pile, while forming at the exposed rear side of the film layer respective loops. The film layer is then exposed to heat, causing it to melt and to bond the loops to the primary backing layer.

10 Claims, 3 Drawing Figures

TUFTED CARPET WITH MELTABLE-FILM PRIMARY-BACKING COMPONENT

BACKGROUND OF THE INVENTION

1. Field of the Invention

The invention is directed to tufted carpets and a method of making the same.

2. Description of the Prior Art

When tufted carpet is made, the pile-forming yarns are tufted into a single substrate, known as the primary backing layer, which may typically be of jute, woven or non-woven polypropylene, a combination of polypropylene and nylon, or other suitable materials. Tufting is carried out from the rear side of the primary backing layer, so that the yarn tufts form loops at this rear side. Afterwards the tufts are locked in place by one of several known methods, for example the hot-melt system involving the application of pre-melted resins, lattices or polyurethane coatings over the rear side of the primary backing layer.

SUMMARY OF THE INVENTION

One purpose of this invention is to obtain the well-known advantages of the hot-melt system, but without having to incur the expense involved in purchasing and maintaining the equipment required for storage of the resin, melting of the resin and application of the melted resin to the primary backing.

Also, the invention obtains improved locking of the tuft yarns to the primary backing.

Furthermore, resort to the present invention reduces porosity of the primary backing and thus reduces carpet flammability in circumstances where oxygen-feed through the primary backing is a contributing factor to the flammability.

A tufted pile carpet according to the invention has a primary backing layer upon the rear side of which a layer of low-melting point synthetic thermoplastic film is superimposed. Pile-forming yarns are tufted through both of these layers, forming a pile at the front side of the primary backing layer and forming loops at the exposed side of the film layer. The latter is melted by application of heat subsequent to tufting, so that it bonds the loops firmly to the primary backing layer.

This provides a carpet wherein the tufts are bonded to the primary backing layer with great firmness, especially because of those portions of the film layer which are located between the loops and the primary backing layer. Also, since there is absolute uniformity in the distribution of the meltable material of the film layer over the rear side of the primary backing layer, including beneath the loops, the porosity of the primary backing layer is substantially reduced over the prior art, for example over conventional melted-latex layers applied to a primary backing, and this decreases flammability of the carpet in the desired manner.

For a better understanding of the invention, as well as further objects and features thereof, reference should be had to the following detailed description in conjunction with the accompanying drawing.

DESCRIPTION OF THE PREFERRED EMBODIMENTS

Figure 1:
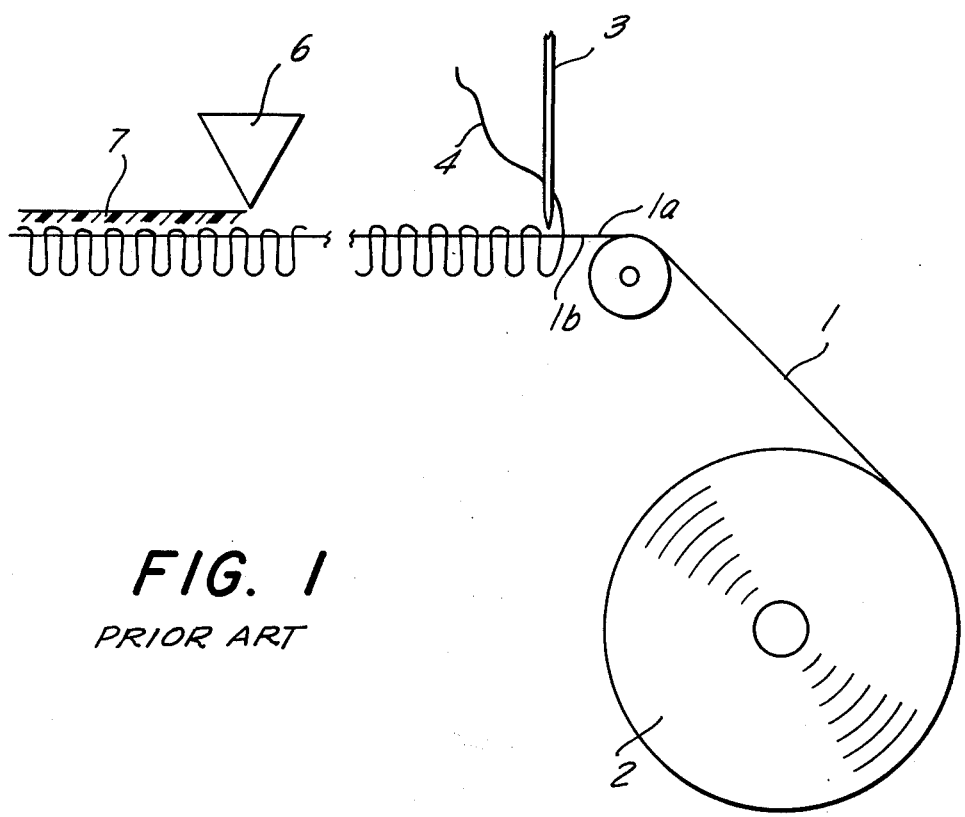
FIG. 1 is a fragmentary, diagrammatic side view showing a tufting process according to the prior art.

FIG. 1 shows how a carpet is tufted in accordance with the prior art.

A primary backing layer 1 of one of the aforementioned materials is withdrawn from a supply roll 2 in the direction of the arrow. As it travels past a tufting station, needles 3 tuft yarn 4 from the rear side 1a through the backing layer 1 so that they form a carpet pile 5 at the front side 1b of the layer 1. The tufting equipment may be, for example, in accordance with the disclosure in U.S. Pat. No. 3,359,934 of H. Schwartz et al. Subsequently, in a separate step a dispenser 6 flows a layer 7 of melted synthetic plastic material — e.g. latex — onto the rear side 1a to lock the yarn stitches 8 in place. In this separate step, the back side of the carpet is coated with either latex, hot melt resin or other material, for instance polyurethane with or without the application of a secondary backing material.

Figure 3:
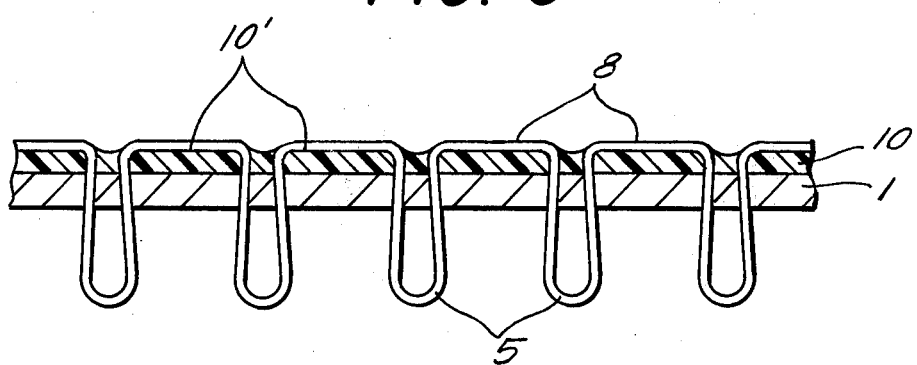
FIG. 3 is a fragmentary enlarged section showing a detail of a carpet according to the invention.
Figure 2:
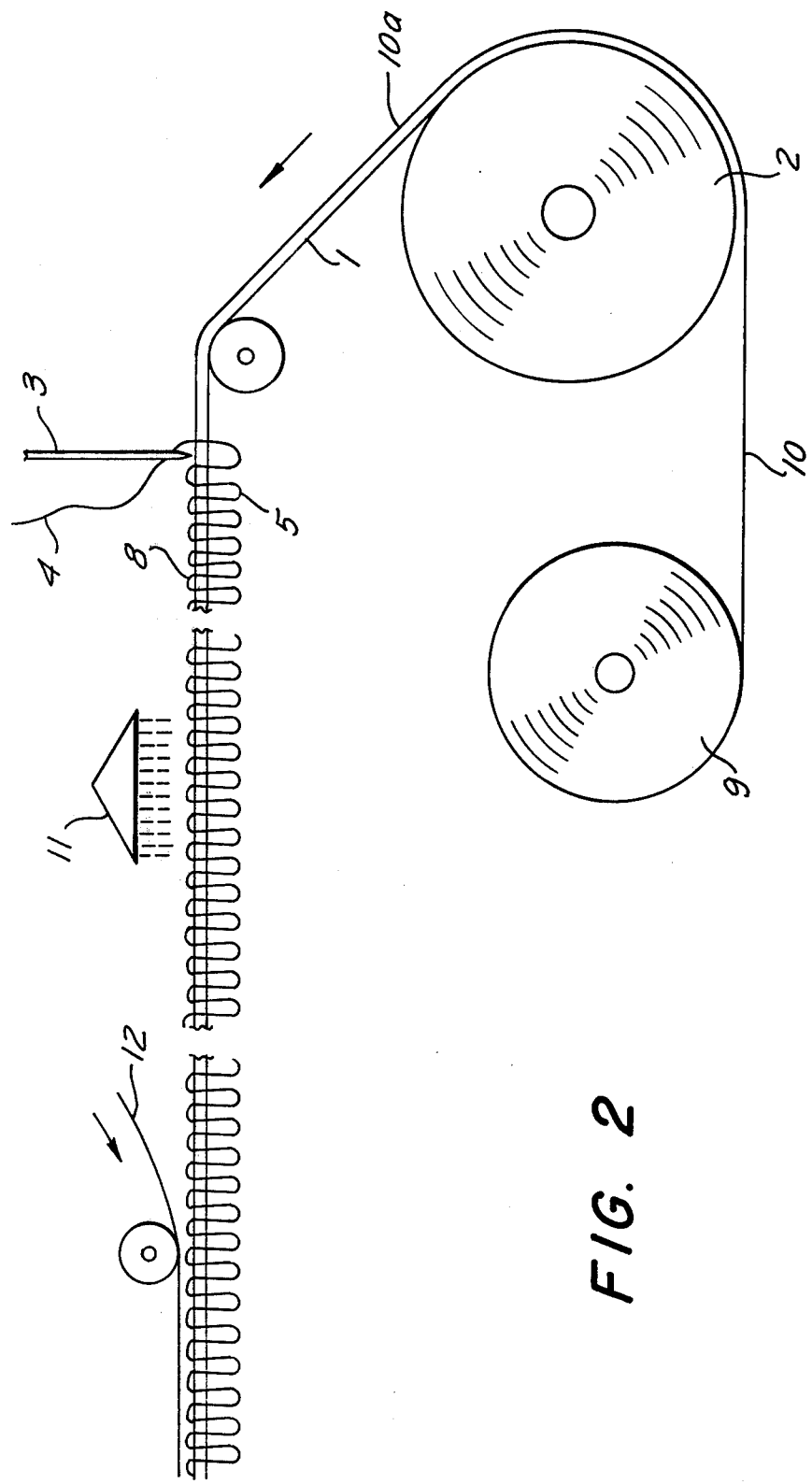
FIG. 2 is a view similar to FIG. 1, but showing the tufting process according to the present invention.

FIGS. 2 to 4 show the present invention, like reference numerals being used to identify the same elements as in FIG. 1.

Thus, FIG. 2 again shows a primary backing layer 1 being withdrawn in the direction of the arrow from a supply roll 2. However, in addition there is a supply roll 9 of low-melting point synthetic plastic film 10, e.g. polyethylene or an equivalent material. As the layers 1 and 10 are jointly withdrawn in the direction of the arrow, the layer 10 becomes superimposed upon the rear side 1a (identified in FIG. 1) of the layer 1 so that both layers travel together past the tufting station where the needles 3 insert the yarn 4. Since the layers 1 and 10 are superimposed, the yarn 4 is tufted through both layers together, again forming the pile 5. The loops 8, however, are now located on the rear (exposed) side 10a of the layer 10. Thereafter, the tufted carpet passes a heat source, e.g. the illustrated infrared radiating device 11, which supplies sufficient heat to melt the film layer 10. The material of the film layer 10 thus bonds firmly to the primary backing layer 1 and to the loops 8, causing the tufts to be strongly locked in place when the molten material of the film layer cools and re-sets. The heat applied to melt the film can also be directed onto the carpet in a separate operation, for instance drying subsequent to dyeing in a beck or through a separate heating step that might serve no other purpose than to melt the film.

If desired, a foam backing or a secondary backing 12 may subsequently be applied over the molten layer 10, to improve the stability and/or underfoot feeling of the carpet. The use of a suitable material for the layer 10 may make it possible to employ the layer 10 to laminate the secondary backing to the primary backing, thus eliminating the need for a separate adhesive.

FIG. 3 shows that the material of the film layer 10 is distributed absolutely uniformly over the rear side of the primary backing layer 1. When prior-art tuft-locking layers of latex are applied to the rear face of the primary backing layer 1 (see FIG. 1), the material does not always penetrate beneath the loops 8, i.e. between them and the rear side of the primary backing layer 1. In consequence, neither the distribution nor the locking effect are especially uniform, and the primary backing layer 1 remains porous at least beneath the loops 8.

By contrast, it will be seen from FIG. 3 that portions 10' of layer 10 are located beneath the loops 8, since the yarn 4 is tufted through the layer 10, and thus even those pores of layer 1 which are located beneath the stitches 8 are sealed when the material of layer 10 is melted by application of heat. This reduces oxygen-flow through the carpet and makes the same less flammable. Moreover, once melted the portions 10' aid in bonding the stitches 8 to the primary backing layer 1 so that an improved tuft-locking effect is obtained, compared to that of conventional filled latex applications.

Carpeting according to the invention has its tufts locked in place with greater strength than before and is less porous, thus reducing the contribution to flammability that can be made by oxygen passing through the carpet backing. Moreover, the need for expensive capital equipment for storing, melting and applying tuft-locking resins, is completely eliminated. Some savings in energy can be realized when the heat to melt the film occurs as an integral part of another necessary operation, for instance carpet drying. Thus, the invention provides a carpet of superior qualities but which can be produced at lesser cost than is known from the prior art.

While a preferred embodiment of the invention has been shown and described, it will be understood that various modifications may be made without departing from the spirit of the invention. The invention is not, therefore, intended to be limited to the showing or description herein, or in any other manner, except as defined in the appended claims.

What is claimed is:

1. A tufted pile carpet, comprising a primary backing layer having a front side and a rear side; a thermally meltable film layer of synthetic plastic material on said rear side; and pile-forming yarn tufted from said rear side through both of said layers to form a pile at said front side and loops at said rear side, said film layer being melted subsequent to tufting of said yarn through said layers so as to bond said loops firmly to said rear side of said primary backing layer.

2. A tufted pile carpet as defined in claim 1, wherein said film layer is of a material having a low melting point so that damage to said yarn and primary backing layer is avoided when said film layer is melted.

3. A tufted pile carpet as defined in claim 1, wherein said film layer is polyethylene.

4. A tufted pile carpet as defined in claim 1, wherein portions of said film layer are interposed between said rear side of said primary backing layer and said loops and when said film layer is melted, bond said loops to said primary backing layer.

5. A tufted pile carpet as defined in claim 1, wherein said primary backing layers have pores, and the melted material of said film layer closes said pores and prevents passage of flame-feeding oxygen therethrough.

6. A method of making a tufted pile carpet, comprising the steps of superimposing a thermally meltable film layer onto the rear side of a primary backing layer; tufting pile-forming yarn from said rear side through the superimposed layers so as to form a carpet pile at the front side of said primary backing layer and loops on the exposed side of said film layer; and exposing said film layer to heat so as to cause it to melt and bond said loops to said primary backing layer.

7. A method as defined in claim 6, wherein the step of superimposing comprises withdrawing said layers from respective supplies in paths which are at least in part parallel to each other.

8. A method as defined in claim 6, wherein said film layer is of a material having a low melting point, and the step of exposing said layer to heat involves the application of heat sufficient to cause said film layer to melt, but insufficient to cause damage to said yarn and said primary backing layer.

9. A method as defined in claim 6, wherein the step of exposing said film layer to heat includes melting of those portions of said film layer which are located between said rear side of said primary backing layer and the respective loops.

10. A method as defined in claim 6, and further comprising the step of securing a secondary backing layer over the melted film layer.

* * * * *